United States Patent
Tabayashi

(10) Patent No.: US 8,104,884 B2
(45) Date of Patent: Jan. 31, 2012

(54) COATING AGENT FOR UV CURABLE INKJET PRINTING

(75) Inventor: Isao Tabayashi, Tomi (JP)

(73) Assignee: Mimaki Engineering Co., Ltd., Nagano (JP)

( * ) Notice: Subject to any disclaimer, the term of this patent is extended or adjusted under 35 U.S.C. 154(b) by 0 days.

(21) Appl. No.: 12/187,647

(22) Filed: Aug. 7, 2008

(65) Prior Publication Data

US 2011/0221839 A1    Sep. 15, 2011

(30) Foreign Application Priority Data

Aug. 22, 2007 (JP) ................... 2007-215531

(51) Int. Cl.
*B41J 2/01* (2006.01)

(52) U.S. Cl. .............. 347/102; 347/101; 347/100

(58) Field of Classification Search .......... 347/102, 347/101, 100, 95, 96, 103, 105; 106/31.6, 106/31.27, 31.13; 523/160, 161
See application file for complete search history.

(56) References Cited

U.S. PATENT DOCUMENTS

| 6,283,589 B1 * | 9/2001 | Gelbart ................. 347/100 |
| 6,420,451 B1 * | 7/2002 | Lin et al. ................ 522/83 |
| 6,461,419 B1 * | 10/2002 | Wu et al. ............... 106/31.6 |
| 2007/0238804 A1 * | 10/2007 | Ho et al. ................. 522/77 |
| 2008/0192103 A1 * | 8/2008 | Daems et al. .......... 347/102 |

FOREIGN PATENT DOCUMENTS

| JP | 61-019389 A | 1/1986 |
| JP | 61-024494 A | 2/1986 |
| JP | 61-032788 A | 2/1986 |
| JP | 61-280983 A | 12/1986 |
| JP | 64-011877 A | 1/1989 |
| JP | 269402 B | 4/1992 |
| JP | 2002371223 A * | 12/2002 |
| JP | 2005-521578 A | 7/2005 |
| WO | WO 02/100652 A1 | 12/2002 |
| WO | WO 03/084760 A1 | 10/2003 |

* cited by examiner

*Primary Examiner* — Manish S Shah

(74) *Attorney, Agent, or Firm* — Ditthavong Mori & Steiner, P.C.

(57) ABSTRACT

A coating agent for use in UV curable inkjet printing using nonaqueous UV ink. The coating agent includes a main component that is an organic-inorganic nanocomposite, and the coating agent is configured to form an undercoat before the inkjet printing or to form a finishing coat after the inkjet printing and UV curing.

18 Claims, 1 Drawing Sheet

COATING AGENT FOR UV CURABLE INKJET PRINTING

CROSS-REFERENCE TO RELATED APPLICATION

The present application claims priority to Japanese Patent Application No. 2007-215531, filed on Aug. 22, 2007, the entire contents of which are herein incorporated by reference.

BACKGROUND OF THE INVENTION

1. Field of the Invention

The present invention relates to a coating agent (hereinafter, coating agent for UV curable inkjet printing) to be used to form an under coat before the printing and a finishing coat after the printing and curing in UV curable inkjet printing using nonaqueous UV ink.

2. Discussion of the Background

A recording substrate has generally been known that improves characteristics of printing by inkjet inks and that includes a base sheet, such as a normal paper or an inkjet printing paper, and a porous inkjet ink receiving layer that is formed on the base sheet and that is made of fine particles such as amorphous silica and a water soluble binder resin such as polyvinyl alcohol (see JP-A-64-011877).

As for base sheets such as a plastic film or a plastic card, there have been proposed (1) an inkjet recording sheet including a transparent synthetic resin sheet and an ink receiving layer, containing polyvinylpyrrolidone, formed on the surface of the transparent synthetic resin sheet (see JP-A-61-032788), (2) a recording sheet including a transparent thermoplastic resin film and a transparent ink receiving layer, containing aqueous resin such as polyvinyl alcohol or gelatine and colloidal silica, formed on the transparent thermoplastic resin film (see JP-A-61-019389), (3) a recording sheet including a transparent plastic film and a water soluble polymer thin film, containing ultrafine particles having average particle diameters from 1 μm to 100 μm and fine particles having average particle diameters from 1 μm to 20 μm, formed on the transparent plastic film (see JP-A-61-280983), (4) an overhead projector film including a transparent film which is coated with a transparent adhesive containing transparent fine particles (such as glass beads and synthetic resin spherical micro beads) having particle diameters from 5 μm to 50 μm (see JP-A-61-024494), and (5) a method of forming an ink receiving layer by applying heated solution, containing at least two components including a water-soluble polymer compound (e.g., polyvinylpyrrolidone) and a water-insoluble polymer compound (e.g., a condensation product of sorbitol and aromatic aldehyde) and a solvent being a good solvent to one of the two components and a poor solvent to the other component, directly to a base, and drying and removing the solvent (see Japanese Patent No. 2694042).

In the technologies described in the above patent documents, however, aqueous dye or hydrophilic pigment is used as colorant. This means that the resulting recording substrates have insufficient water resistance and poor abrasion resistance. However, a typical condition required for printing on, for example, a plastic card is a highly advanced resistance, as compared to a case where printing is performed on a normal paper.

For this, a printed surface is protected by over coating. For the over coating, an ultraviolet curable ink (paint), an aqueous ink (paint), or a solvent-based ink (paint) may be widely employed. However, the aqueous paint is not practical because it requires time for a drying process and the drying affects the base. Further, the solvent-base paint has problems in that the solvent evaporates into the surrounding air due to drying and thus affects the working atmosphere and worker's health, also leading to a burden on the global environment.

Under the aforementioned circumstances, the following technologies have been proposed.

In a method of printing an image on an object, it has been proposed to use a thermoplastic resin supplied by Valspar of High Point, N.C. as a coating material used in a step of forming an under coat, which has a high surface tension in the range of 38-50 surface dynes and should be applied in a smooth coat without dry spray to maximize ink droplet formation. As a top coat applied to the outer surface after the step for applying the ink droplets, a clear (transparent) varnish has been proposed (see JP-A-2005-521578).

Also, a method for producing an inkjet printed matter has been proposed in which a white undercoat layer (I) is formed on a base by using a white paint containing silica particles of which the oil absorption is 10-400 ml/100 g and having a pigment volume concentration of 5-90%, a printed layer (II) is formed on the white undercoat layer (I) by inkjet method using an aqueous ink composition, and a clear coat layer (III) is formed on the printed layer (II) by using a clear paint (see WO2002-100652).

However, when the technologies described in JP-A-2005-521578 and WO2002-100652 are adapted to a printing system using UV curable inkjet inks, there are limits on improvements in adhesion relative to glass and metal, and in abrasion-resistance of printed matter.

SUMMARY OF THE INVENTION

The present invention advantageously provides embodiments that include a coating agent for use in UV curable inkjet printing using nonaqueous UV ink, where the coating agent includes a main component that is an organic-inorganic nanocomposite, and where the coating agent is configured to form an undercoat before the inkjet printing or to form a finishing coat after the inkjet printing and UV curing.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EXEMPLARY EMBODIMENTS OF THE INVENTION

Figure 1:
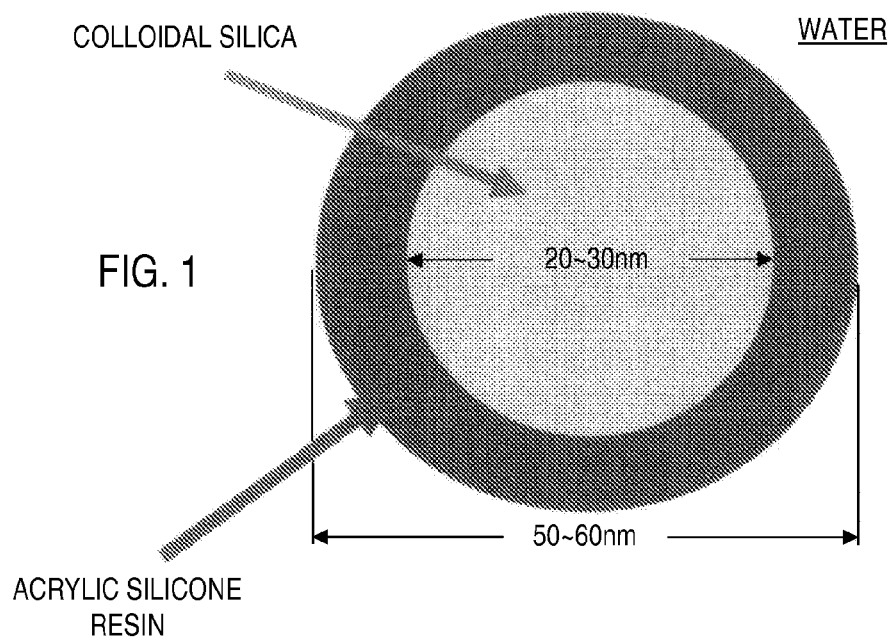
FIG. 1 is a schematic illustration of a core shell-type composite particle, in which an outer surface of colloidal silica is coated by acrylic silicone.

Embodiments of the present invention will be described hereinafter with reference to the accompanying drawings. In the following description, the constituent elements having substantially the same function and arrangement are denoted by the same reference numerals, and repetitive descriptions will be made only when necessary.

Embodiments of the present invention advantageously provide a coating agent to be used in UV curable inkjet printing using nonaqueous UV ink, which can improve durability of a printed matter, such as adhesion relative to a base and abrasion-resistance of the printed matter.

Embodiments of the present invention advantageously provide a coating agent to be used in UV curable inkjet printing using nonaqueous UV ink, for forming an under coat having excellent adhesion relative to a base and excellent adhesion relative to an ink cured layer.

Embodiments of the present invention advantageously provide a coating agent to be used in UV curable inkjet printing using nonaqueous UV ink, for forming a finishing coat having excellent adhesion relative to the ink cured layer and extremely excellent abrasion-resistance.

Accordingly, embodiments of the present invention provide a coating agent to be used in UV curable inkjet printing using nonaqueous UV ink, which can improve durability of a printed matter such as adhesion relative to a base and fastness to rubbing of the printed matter.

In a first arrangement, a coating agent is provided to be used in UV curable inkjet printing using nonaqueous UV ink, for forming an under coat before the printing or a finishing coat after the printing and curing, wherein the main component of the coating agent is organic-inorganic nanocomposite.

In a second arrangement, a coating agent is provided to be used in UV curable inkjet printing as described in the first arrangement, where the organic-inorganic nanocomposite is an organic-inorganic nanocomposite of which the inorganic component is silicon compound and the organic component is polymeric compound which is dispersible in water or in organic solvent.

In a third arrangement, a coating agent is provided to be used in UV curable inkjet printing as described in the second arrangement, where the silicon compound is water dispersible colloidal silica obtained from organosilane compound by sol-gel method or colloidal silica obtained from inorganic silicate and the organic component is polymeric compound which is dispersible in water.

In a fourth arrangement, a coating agent is provided to be used in UV curable inkjet printing as described in the second or third arrangement, where the organic-inorganic nanocomposite is an organic-inorganic nanocomposite in which the silicon compound is colloidal silica of which the periphery is coated with water dispersible polymer.

In a fifth arrangement, a coating agent is provided to be used in UV curable inkjet printing as described in the second arrangement, where the silicon compound is organic solvent dispersible colloidal silica and the organic component is polymeric compound which is soluble or dispersible in organic solvent.

Hereinafter, embodiments of the present invention will be described in detail.

In an embodiment, in UV curable inkjet printing using nonaqueous UV ink, a coating agent for UV curable inkjet printing of which the main component is organic-inorganic nanocomposite material is applied to form an under coat before the printing or a finishing coat after printing and curing (first arrangement).

As the coating agent of which the main component is organic-inorganic nanocomposite material, a commercially available coating agent (SSG coat; ordinary-temperature cure coating agent of which the main component is organic-inorganic nanocomposite material: available from Nitto Boseki Co., Ltd.) may be used. Alternatively, such a coating agent can be obtained by the following method in accordance with the intended use.

It is preferable that the organic-inorganic nanocomposite is an organic-inorganic nanocomposite of which the inorganic component is silicon compound and the organic component is polymeric compound which is dispersible in water or polymeric compound which is dispersible in organic solvent (second arrangement).

An organic-inorganic nanocomposite of which the organic component is polymeric compound which is soluble in water is not preferable because it is easy to peel off in practice. In addition, also in case of UV curable inkjet printing using aqueous UV ink, the organic-inorganic nanocomposite is not preferable because of insufficient adhesion.

It is preferable that the aforementioned silicon compound is water dispersible colloidal silica obtained from organosilane compound by sol-gel method or colloidal silica obtained from inorganic silicate and the aforementioned organic component is polymeric compound which is dispersible in water (third arrangement).

Since ordinary powder-like silica particles are difficult to be uniformly dispersed, water dispersible colloidal silica produced directly in liquid by the sol-gel method is preferable as the silicon compound as the inorganic component. Colloidal silica particles may be produced from silicate. The organic component is preferably selected from polymers which are dispersible in water.

As the colloidal silica, a commercially available one (e.g., colloidal silica manufactured by Nissan Chemical Industries, Ltd.: SNOWTEX XS, OXS, S, OS, 20, 30, 40, 0, N, C, AK, 50, 0-40, CM, 20L, OL, XL, ZL, MP-2040, MP-4540M, UP, OUP, SP-S, PS-M (these are SNOWTEX) and Lithium Silicate 45) may be used. However, the present invention is not limited thereto.

It is preferable that the aforementioned organic-inorganic nanocomposite is an organic-inorganic nanocomposite in which the silicon compound is colloidal silica of which the periphery is coated with water dispersible polymer (fourth arrangement).

Hybrid-type nanoparticles (organic-inorganic nanocomposite particles) in which the silicon compound is colloidal silica of which the periphery is coated with water dispersible polymer as mentioned above are excellent especially for characteristics of an organic-inorganic nanocomposite coat obtained using the nanoparticles.

The manufacturing method described in, for example, JP2000-290464 may be applied to the method for manufacturing the aforementioned organic-inorganic nanocomposite particles.

A commercially available organic-inorganic nanocomposite particle (e.g., Nanocomposite W: manufactured by Mizutani Paint Co., Ltd.) may be used or concomitantly used as the organic-inorganic nanocomposite particles.

Figure 2:
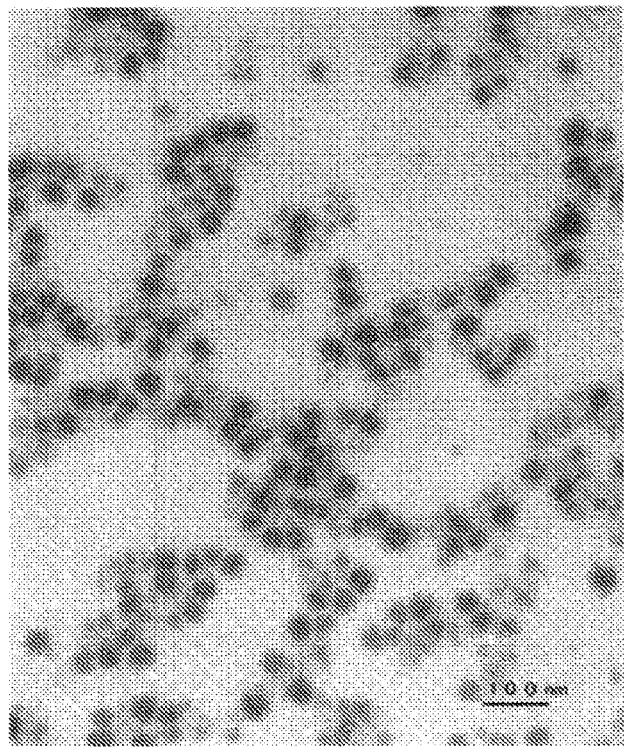
FIG. 2 is an electron micrograph of core shell-type composite particles, in which outer surfaces of colloidal silica are coated by acrylic silicone.

FIG. 1 is a schematic view illustrating a core shell-type composite particle (e.g., about 50 to about 60 nm in particle diameter) (e.g., Nanocomposite W manufactured by Mizutani Paint Co., Ltd.) in which outer surface of colloidal silica (e.g., about 20 to about 30 nm in particle diameter) is coated by acrylic silicone. FIG. 2 is an electron micrograph of core shell-type composite particles (e.g., Nanocomposite W manufactured by Mizutani Paint Co., Ltd.) in which outer surfaces of colloidal silica are coated by acrylic silicone.

In another embodiment of the present invention, it is preferable that the aforementioned silicon compound is organic solvent dispersible colloidal silica and the aforementioned organic component is polymeric compound which is soluble or dispersible in organic solvent (fifth arrangement).

A coating agent in which the silicon compound is organic solvent dispersible colloidal silica and the organic component is selected from polymers which are soluble or dispersible in organic solvent has such a property as to easily get wet relative to even a water-shedding surface.

The organic solvent dispersible colloidal silica can be easily synthetically prepared in organic solvent using a known method and may be a commercially available one (e.g., organic solvent dispersible colloidal silica manufactured by Nissan Chemical Industries, Ltd.: ORGANO SILICA SOL: IPA-ST, IPA-ST-UP, IPA-ST-ZL, EG-ST, NPC-ST-30, DMAC-ST, MEK-ST, MIBK-ST, XBA-ST, PMA-ST, PGM-ST). However, the present invention is not limited thereto.

In the coating agent, as the resin-matrix component, various resins such as acrylic resins, polyester resins, alkyd resins, urethane resins, and epoxy resins which may have a functional group such as hydroxyl group, carboxyl group, and amino group may be employed. These resins may be suitably blocked.

The coating agent may be used in combination with a cross-linking agent such as a polyisocyanate compound and amino resin.

The coating agent may be of any of a non-curable type of a lacquer-type, an ordinary-temperature curable type, and a thermosetting type. Alternatively, the coating agent may be of such a type as to cure by active beam such as ultraviolet beam or electron beam.

The coating agent is preferably of an urethane curable type containing as a resin component a polyisocyanate compound, which may be blocked with polyacrylic polyol or polyester polyol, or an ultraviolet curable type containing an ultraviolet curable acryl resin as a resin component.

Specific examples of acrylic binders for the ultraviolet curable coating agent include acrylic light curing components. Either of an acrylic light curing component having hydrophilic property (e.g., acrylic light curing components such as polyethylene glycol diacrylate (e.g., where "n" is 3 or more and below about 14) having ethylene glycol units in the molecule, and trimethylolpropane EO-modified triacrylate (e.g., where "n" is 3 or more and below about 14)) and an acrylic light curing component having hydrophobic property (e.g., acrylic light curing components such as polyethylene glycol diacrylate which does not have ethylene glycol units in the molecule or of which "n" is 2 or less even having ethylene glycol units in the molecule, and trimethylolpropane EO-modified triacrylate (e.g., where "n" is 2 or less)) may be employed.

Specific examples of photopolymerizable monomers having hydrophilic property include unsaturated carboxylic acids such as acrylic acid or methacrylic acid and esters thereof, alkyl (meth)acrylate, cycloalkyl (meth)acrylate, alkyl halide (meth)acrylate, alkoxyalkyl (meth)acrylate, hydroxylcycloalkyl (meth)acrylate, aminoalkyl (meth)acrylate, tetrahydrofurfuryl (meth)acrylate, allyl (meth)acrylate, glycidyl (meth)acrylate, benzyl (meth)acrylate, phenoxy (meth)acrylate, trimethylolpropane tri(meth)acrylate, pentaerythritol tetra(meth)acrylate, acrylamide, methacrylamide, and derivatives thereof.

For applications where cure shrinkage is an obstacle, as the photopolymerizable monomer, it is preferable to employ, for example, isobornyl (meth)acrylate, norbornyl (meth)acrylate, dicyclopentenoxy ethyl (meth)acrylate, dicyclopentenoxy propyl (meth)acrylate, (meth)acrylic acid ester of diethylene glycol dicyclopentenyl monoether, dicyclopentenyl cinnamate, dicyclopentenoxy ethyl cinnamate, dicyclopentenoxy ethyl cinnamate mono- or di-fumarate, 3,9-bis(1,1-bismethyl-2-oxyethyl)-spiro[5,5]undecane mono- or di-(meth)acrylate, 3,9-bis(1,1-bismethyl-2-oxyethyl)-2,4,8,10-tetraoxaspiro[5,5]undecane mono- or di-(meth)acrylate, 3,9-bis(2-oxyethyl)-spiro[5,5]undecane mono- or di-(meth)acrylate, 3,9-bis(2-oxyethyl)-2,4,8-10-tetraoxaspiro[5,5]undecane mono- or di-(meth)acrylate, methyl ether of the above mono(meth)acrylates, 1-azabicyclo[2,2,2]-3-octenyl (meth)acrylate, bicyclo[2,2,1]-5-heptene-2,3-dicarboxyl monoallyl ester, dicyclopentadienyl (meth)acrylate, dicyclopentadienyl oxyethyl (meth)acrylate, and dihydrodicyclopentadienyl (meth)acrylate.

These photopolymerizable monomers may be used alone or in combination.

Specific examples of acrylic photopolymerizable oligomers having hydrophobic property include acrylic acid esters of epoxy resin such as bisphenol A diglycidyl ether diacrylate, reactive products of epoxy resin with acrylic acid and methyltetrahydrophthalic anhydride, reactive products of epoxy resin with 2-hydroxyethyl acrylate, ring-opening copolymerization esters of glycidyl diacrylate and phthalic anhydride, reactive products of methyl vinyl ether-maleic anhydride copolymers and 2-hydroxyethyl acrylate, polyacrylic or maleic prepolymers obtainable by further reacting the reactive products with glycidyl methacrylate, urethane prepolymer which have acryloyl groups or methacryloyl groups at both terminals and in which a saturated polyester segments are connected via an urethane bond, and the like.

These acrylic photopolymerizable oligomers having a weight average molecular weight ranging from 2000 to 30000 are suitably used.

As a photopolymerization initiator, a conventional one may be employed. Specific examples include 1-hydroxy-cyclohexyl-phenyl-ketone, 2-hydroxy-2-methyl-1-phenyl-propane-1-one, 1-[4-(2-hydroxyethoxy)-phenyl]-2-hydroxymethyl-1-propane-1-one, 2-methyl-1-[4-(methylthio)phenyl]-2-morpholino propane-1-one, 2-benzyl-2-dimethylamino-1-(4-morpholinophenyl)-butanone-1-bis(2,6-dimethoxybenzoil)-2,4,4-trimethylpentyl phosphineoxide-bis(2,4,6-trimethylbenzoil)-phenyl phosphineoxide and the like.

These photopolymerization initiators may be used alone or in combination. The contained amount of the photopolymerization initiator is generally preferably selected from a range from 5 to 15 parts by mass per 100 parts by mass of acrylic-type light curable component.

The UV ink used for UV curable inkjet printing is preferably nonaqueous UV ink Aqueous UV ink is not preferable as the UV ink used for UV curable inkjet printing because of insufficient adhesion.

There is no limitation on nonaqueous UV ink in the present invention and thus existing commercially available nonaqueous UV inks and nonaqueous UV inks which are prepared by dispersing a pigment into a photopolymerizable component which is any one of the aforementioned photopolymerizable monomers or a combination of any one of the aforementioned photopolymerizable monomers and a photopolymerizable oligomer and filtering the pigment-dispersed photopolymerizable component may be employed.

Hereinafter, exemplary embodiments of the present invention will be described. However, the present invention is not limited thereto.

Example 1

After SSG coat (organic-inorganic nanocomposite ordinary-temperature cure coating agent: available from Nitto Boseki Co., Ltd) was coated on a glass plate and was left at a room temperature for 30 minutes, printing on this coat was conducted by a UV curable inkjet printer (manufactured by Mimaki Engineering Co., Ltd.).

A printed matter thus obtained has excellent adhesion relative to the glass plate.

Example 2

Following Example 1, SSG coat (organic-inorganic nanocomposite ordinary-temperature cure coating agent: available from Nitto Boseki Co., Ltd) was coated over the printed matter obtained in Example 1 and was left at a room temperature for 60 minutes.

A printed matter thus obtained has excellent adhesion relative to the glass plate and is very hard and thus extremely good in abrasion-resistance.

Example 3

After Nanocomposite W (manufactured by Mizutani Paint Co., Ltd.) was coated on a stainless plate and was left at a room temperature for 1 hour, printing on this coat was conducted by the UV curable inkjet printer (manufactured by Mimaki Engineering Co., Ltd.).

A printed matter thus obtained has excellent adhesion relative to the stainless plate.

Comparative Example 1

Printing on a glass plate without the SSG coat of Example 1 was conducted by the UV curable inkjet printer (manufactured by Mimaki Engineering Co., Ltd.).

A printed matter thus obtained has extremely poor adhesion relative to the glass plate so that the ink coating easily peels.

Thus, embodiments of the present invention advantageously provide a coating agent for forming an under coat, having excellent adhesion relative to a base and excellent adhesion relative to an ink cured layer and also a coating agent for forming a finishing coat having extremely excellent abrasion-resistance, in UV curable inkjet printing using nonaqueous UV ink.

For example, there is provided a coating agent to be used in UV curable inkjet printing using nonaqueous UV ink, for forming an under coat before the printing or a finishing coat after the printing and curing, wherein the main component of the coating agent is organic-inorganic nanocomposite (an example of which is shown in FIG. 1).

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A coating agent for use in UV curable inkjet printing using nonaqueous UV ink, said coating agent comprising:
    a main component that is an organic-inorganic nanocomposite, said organic-inorganic nanocomposite comprising:
        an inorganic component that is a silicon compound; and
        an organic component that is a polymeric compound that is dispersible in water or in an organic solvent,
    wherein the coating agent is configured to form an undercoat before the inkjet printing or to form a finishing coat after the inkjet printing and UV curing, and
    wherein a periphery of said silicon compound is coated with a layer of said polymeric compound.

2. The coating agent as claimed in claim 1, wherein:
    said silicon compound is:
        a water dispersible colloidal silica obtained from organosilane compound by sol-gel method, or
        colloidal silica obtained from inorganic silicate; and
    said polymeric compound is dispersible in water.

3. The coating agent as claimed in claim 1, wherein:
    said silicon compound is a colloidal silica having a particle diameter from about 20 nm to about 30 nm; and
    said organic component is an acrylic silicone having a particle diameter from about 50 nm to about 60 nm.

4. The coating agent as claimed in claim 1, wherein:
    said silicon compound is a colloidal silica;
    said organic component is a water dispersible polymer; and
    a periphery of said colloidal silica is coated with said water dispersible polymer.

5. The coating agent as claimed in claim 1, wherein:
    said silicon compound is an organic solvent dispersible colloidal silica; and
    said polymeric compound is soluble or dispersible in an organic solvent; and
    a periphery of said organic solvent dispersible colloidal silica is coated with a layer of said polymeric compound.

6. The coating agent as claimed in claim 1, further comprising a resin-matrix component.

7. A method of UV curable inkjet printing using nonaqueous UV ink, said method comprising:
    forming an undercoat on a printing medium, the undercoat being formed of a coating agent having a main component that is an organic-inorganic nanocomposite, said organic-inorganic nanocomposite comprising:
        an inorganic component that is a silicon compound; and
        an organic component that is a polymeric compound that is dispersible in water or in an organic solvent;
    forming an image on the undercoat using the nonaqueous UV ink; and
    curing the nonaqueous UV ink,
    wherein a periphery of said silicon compound is coated with a layer of said polymeric compound.

8. The method as claimed in claim 7, wherein:
    said silicon compound is:
        a water dispersible colloidal silica obtained from organosilane compound by sol-gel method, or
        colloidal silica obtained from inorganic silicate; and
    said polymeric compound that is dispersible in water.

9. The method as claimed in claim 7, wherein:
    said silicon compound is a colloidal silica;
    said organic component is a water dispersible polymer; and
    a periphery of said colloidal silica is coated with said water dispersible polymer.

10. The method as claimed in claim 7, wherein:
    said silicon compound is an organic solvent dispersible colloidal silica;
    said polymeric compound is soluble or dispersible in an organic solvent; and
    a periphery of said organic solvent dispersible colloidal silica is coated with a layer of said polymeric compound.

11. The method as claimed in claim 7, wherein:
    said silicon compound is a colloidal silica having a particle diameter from about 20 nm to about 30 nm; and
    said organic component is an acrylic silicone having a particle diameter from about 50 nm to about 60 nm.

12. The method as claimed in claim 7, wherein
    the coating agent further comprises a resin-matrix component.

13. A method of UV curable inkjet printing using nonaqueous UV ink, said method comprising:
   forming an image on a printing medium using the nonaqueous UV ink;
   curing the nonaqueous UV ink; and
   forming a finishing coat on the printing medium having the image, the finishing coat being formed of a coating agent having a main component that is an organic-inorganic nanocomposite, said organic-inorganic nanocomposite comprising:
      an inorganic component that is a silicon compound; and
      an organic component that is a polymeric compound that is dispersible in water or in an organic solvent,
   wherein a periphery of said silicon compound is coated with a layer of said polymeric compound.

14. The method as claimed in claim 13, wherein:
   said silicon compound is:
      a water dispersible colloidal silica obtained from organosilane compound by sol-gel method, or
      colloidal silica obtained from inorganic silicate; and
   said polymeric compound is dispersible in water.

15. The method as claimed in claim 13, wherein:
   said silicon compound is a colloidal silica;
   said organic component is a water dispersible polymer; and
   a periphery of said colloidal silica is coated with said water dispersible polymer.

16. The method as claimed in claim 13, wherein:
   said silicon compound is an organic solvent dispersible colloidal silica;
   said polymeric compound is soluble or dispersible in an organic solvent; and
   a periphery of said organic solvent dispersible colloidal silica is coated with a layer of said polymeric compound.

17. The method as claimed in claim 13, wherein:
   said silicon compound is a colloidal silica having a particle diameter from about 20 nm to about 30 nm; and
   said organic component is an acrylic silicone having a particle diameter from about 50 nm to about 60 nm.

18. The method as claimed in claim 13, wherein
   the coating agent further comprises a resin-matrix component.

* * * * *